(12) United States Patent
Leonard (10) Patent No.: US 7,543,804 B2
(45) Date of Patent: *Jun. 9, 2009

(54) FLUID SUSPENSION MEMBER HAVING GROOVED INLET

(75) Inventor: Joshua R. Leonard, Noblesville, IN (US)

(73) Assignee: BFS Diversified Products, LLC, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/890,141

(22) Filed: Aug. 3, 2007

(65) Prior Publication Data

US 2008/0018029 A1 Jan. 24, 2008

Related U.S. Application Data

(63) Continuation of application No. 10/976,214, filed on Oct. 28, 2004, now Pat. No. 7,270,317.

(51) Int. Cl.
F16F 9/04 (2006.01)
(52) U.S. Cl. .............. 267/64.27; 267/64.23; 267/64.28; 285/235
(58) Field of Classification Search .............. 267/64.11, 267/64.19, 64.21, 64.23, 64.24, 64.27, 64.28; 188/322.21; 285/223–235
See application file for complete search history.

(56) References Cited

U.S. PATENT DOCUMENTS

| 2,960,333 | A | 11/1960 | McGavern, Jr. et al. |
|---|---|---|---|
| 3,081,075 | A | 3/1963 | Selman |
| 3,584,856 | A | 6/1971 | Debois et al. |
| 3,727,899 | A | 4/1973 | Pemberton |
| 3,876,193 | A | 4/1975 | Clary |
| 3,909,036 | A | 9/1975 | Pound |
| 4,470,164 | A | 9/1984 | Soderstrom et al. |
| 4,621,796 | A | 11/1986 | Fresch et al. |
| 4,715,107 | A | 12/1987 | Fresch et al. |
| 4,733,692 | A | 3/1988 | Kotake et al. |
| 4,766,628 | A | 8/1988 | Walker |
| 4,899,995 | A | 2/1990 | Hoffman et al. |
| 5,234,203 | A | 8/1993 | Smith |
| 5,314,045 | A | 5/1994 | Fenn et al. |
| 5,468,028 | A | 11/1995 | Olson |
| 5,518,225 | A | 5/1996 | Gubitz |
| 5,588,640 | A | 12/1996 | Romer |
| 5,671,907 | A | 9/1997 | Arnold |
| 5,681,061 | A | 10/1997 | Olson |
| 5,683,120 | A | 11/1997 | Brock et al. |
| 5,722,696 | A | 3/1998 | Taneya |
| 5,975,506 | A | 11/1999 | Thurow et al. |
| 6,006,873 | A | 12/1999 | Kirst |
| 6,123,325 | A | 9/2000 | Buchanan et al. |
| 6,145,894 | A | 11/2000 | Myers |
| 6,164,314 | A | 12/2000 | Saputo et al. |
| 6,170,887 | B1 | 1/2001 | Salomon-Bahls et al. |
| 6,199,837 | B1 | 3/2001 | Leonard et al. |
| 6,206,604 | B1 | 3/2001 | Dembowsky et al. |

(Continued)

*Primary Examiner*—Pam Rodriguez
(74) *Attorney, Agent, or Firm*—Sarah M. Jabbari; Fay Sharpe LLP (57) ABSTRACT

A fluid suspension member having a flexible wall at least partially defining a fluid chamber and having a passage formed therethrough. A connector fitting is received within the passage, and a groove extends into the flexible wall adjacent the passage. A method is also disclosed.

19 Claims, 7 Drawing Sheets

U.S. PATENT DOCUMENTS

| | | |
|---|---|---|
| 6,332,602 B1 | 12/2001 | Oishi |
| 6,371,462 B2 | 4/2002 | Gennesseaux |
| 6,454,248 B2 | 9/2002 | Pradel |
| 6,457,702 B1 | 10/2002 | Oishi |
| 6,554,323 B1 | 4/2003 | Salomon-Bahls et al. |
| 6,814,639 B1 | 11/2004 | Peterson |
| 7,270,317 B2 * | 9/2007 | Leonard .................. 267/64.27 |
| 2001/0024004 A1 | 9/2001 | Pradel |

* cited by examiner

FLUID SUSPENSION MEMBER HAVING GROOVED INLET

This application is a continuation of U.S. patent application Ser. No. 10/976,214, filed on Oct. 28, 2004, now U.S. Pat. No. 7,270,317, which is hereby incorporated herein by reference in its entirety.

BACKGROUND

The subject novel concept broadly relates to the art of suspension systems and, more particularly, to a novel interface for connecting a fluid transmission line to a fluid suspension member.

The subject novel concept finds particular application in association with fluid suspension members, such as air springs used on a suspension system of a vehicle, and will be discussed herein with particular reference thereto. However, it will be appreciated that the subject novel concept is equally applicable for use in other applications and environments, and is not intended to be in any way limited to use in the applications discussed herein, which are merely exemplary.

Fluid suspension members having an inlet for connecting a fluid transmission line are generally well known. One example of such a fluid suspension member is disclosed in U.S. Pat. No. 6,145,894 to Myers, which is hereby incorporated herein by reference in its entirety.

Fluid suspension members have been commonly used in a wide variety of applications, such as vehicle suspension systems, for example, with great success. Fluid suspension members for vehicle suspension systems are available in a wide variety of types, styles and configurations, including those with rigid end members as well as designs with flexible end walls. Though numerous advantages exist with the regard to the use of fluid suspension members in vehicle suspension systems, there are also areas for improvement, such as reducing maintenance or increasing the ease of installation, for example.

One such opportunity for improvement exists in fluid suspension members having flexible end walls. Vehicle suspension systems by their very nature are designed to permit dynamic movement between various portions and components of the vehicle. As such, it is common for parts associated therewith to be repeatedly flexed or stressed. Fluid suspension members are one example of such parts, and those having flexible end walls are typically well adapted for such flexing action.

Connection of such fluid suspension members to a fluid supply is typically accomplished through a fitting installed on the end wall of the fluid suspension member, as is shown in the Myers '894 patent, for example. Importantly, the fitting, which is commonly made from metal, forms a fluid-tight seal with the flexible end wall on which it is installed. Repeated flexing of the end wall, however, can cause the flexible material surrounding the fitting to become separated from the fitting body. This typically compromises the seal around the fitting body, resulting in fluid loss which can cause reduced efficiency of the system among other problems.

One significant source of separation is caused by inflation-induced stresses along the flexible wall on which the fitting is installed. That is, the opposing end walls of the fluid suspension member become somewhat crowned or dome-shaped due to the pressure within the fluid chamber. The nature of the deflection and the typical positioning of the fitting on the end wall cause any forces acting to seal against the fitting to be overcome. This can undesirably result the loss of integrity of the fluid-tight seal formed around the fitting.

Various arrangements have been employed to improve the interconnection between the fitting body and the flexible end wall. One method has been to mold the fitting body into the part during the manufacture of the flexible wall. Unfortunately, the mechanical properties of the wall material alone are insufficient to consistently withstand the separation stresses discussed above. However, even with any adhesion and residual compressive stresses attributable to the overmolding process, this connection method has not been successful on a consistent basis. Another method that has been used to improve the interconnection between the fitting body and the surrounding flexible material includes the use of adhesive. Though this arrangement significantly strengthens the interconnection between the fitting body and the flexible wall, the adhesive and process of applying the same cause undesirable increases in manufacturing costs among other disadvantages.

BRIEF SUMMARY

A fluid suspension member according to one embodiment of the present novel concept and adapted for use with an associated fluid line is provided and includes a flexible wall at least partially defining a fluid chamber. The flexible wall has a passage formed therethrough. A connector fitting forms a substantially fluid-tight seal with the associated fluid line and is received within the passage. A groove extends into the flexible wall adjacent at least a portion of the passage.

An air spring according to another embodiment of the present novel concept and for use on an associated vehicle suspension system having an associated fluid line is provided and includes first and second flexible end walls in spaced relation to one another and at least one side wall extending between the first and second end walls. The first end wall includes a passage extending therethrough and a groove extending into the first end wall adjacent the passage. The air spring also includes a connector fitting having a fitting body receiving the associated fluid line and a retaining member retaining the associated fluid line in the fitting body. The connector fitting is secured on the first end wall along the passage.

A method of manufacturing a fluid suspension member in accordance with the present novel concept and for use with a fluid line of a suspension system is also provided and includes a step of forming a first wall having a passage therethrough and a groove extending into the first wall adjacent at least a portion of the passage. Another step includes providing a connector fitting for receiving the fluid line and positioning the connector fitting on the first wall within the passage. Additional steps include providing a second wall at least partially defining a fluid chamber and securing the second wall on the first wall.

DETAILED DESCRIPTION

Figure 1:
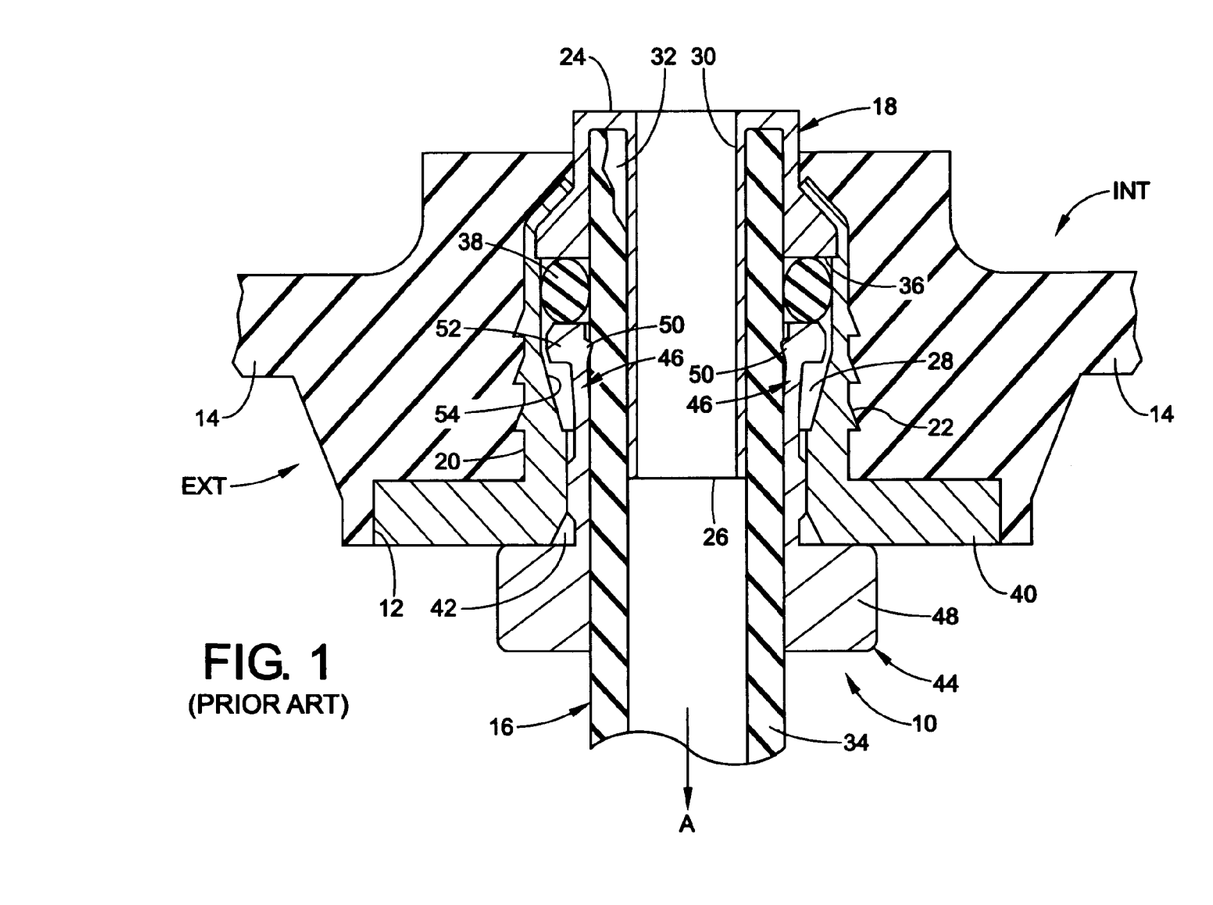
FIG. 1 is a side view, in cross section, of a known air spring and connection fitting arrangement.

FIG. 1 illustrates a known air spring, such as is shown in U.S. Pat. No. 6,145,894, for example, which includes a push-pull connector indicated generally at 10 mounted on an opening 12 formed in an end wall 14 of the air spring. Connector 10 is referred to as a push-pull connector describing its particular function that when a tube 16 is pushed into the connector and then pulled slightly in the opposite direction, it will grip and lock the tube within the connector without requiring any further manipulation of the connector or additional attachment devices and/or elements to retain the tube in a fixed, fluid-tight seal therein.

Connector 10 includes a main body 18 which may be a single piece or multi-piece construction. Body 18 includes an outer annular wall 20 having a plurality of annular ribs or barbs 22 formed thereon so that when molded within opening 12 of end wall 14, it will be securely retained within the adjacent material of the air spring. Body 18 further includes an inner or bottom wall 24 and has a cylindrical tube support sleeve 26 extending axially therefrom and projecting within a hollow interior 28 of body 18. Sleeve 26 forms an inner cylindrical bore 30 and an outer annular tube-receiving space 32 which will have a radial width generally complementary to and just slightly larger than the thickness of cylindrical wall 34 that forms tube 16. An annular shoulder or radial ledge 36 is formed within hollow interior 28 of body 18 and provides a seat for a sealing member, such as an o-ring 38. The opposite end of body 18 from bottom wall 24 terminates in an annular outwardly-extending radial collar 40 that surrounds an end opening 42 which communicates with hollow interior 28.

A separate collet member indicated generally at 44, is slidably and rotatably mounted within hollow interior 28 of body 18. Collet 44 includes a plurality of flexible legs or fingers 46 that extend in a cantilevered fashion from an annular end collar 48. The fingers are separated from one another by axially extending slots (not shown). Each flexible finger 46 has an inwardly projecting barb 50 and an outwardly extending projection 52 formed on the free end of the finger. As tubing 16 is pulled in the direction of arrow A, projection 52 engages an inside wall 54 of body 18 opposite barbs 22. This action causes fingers 46 to be deflected inwardly such that barbs 50 thereon grip and retain tubing 16.

End wall 14 along with the other walls of the air spring together define an internal volume or chamber as is well understood by those of skill in the art. Thus, end wall 14 has an exterior surface indicated generally at EXT and a corresponding interior surface indicated generally at INT. Main body 18 of connector 10 is oriented on end wall 14 such that collar 40 is disposed along exterior surface EXT. Body 18 is retained on end wall 14 by a combination of the material forming the end wall adhering to the outer surface of the main body as well as by the projection of barbs 22 radially outwardly which engages this same material. As mentioned above, however, the fluid-tight seal formed between the material of end wall 14 and connector 10 can be compromised if the adhesion therebetween is not maintained and separation of the end wall material from body 18 occurs. Additionally, a reduction in the adhesion of the end wall material to body 18 can also result in the same becoming loosened and, in extreme cases, pulling out from end wall 14 altogether due to tension or pulling forces acting on tube 16 from the exterior of the air spring as indicated generally by arrow A.

Figure 2:
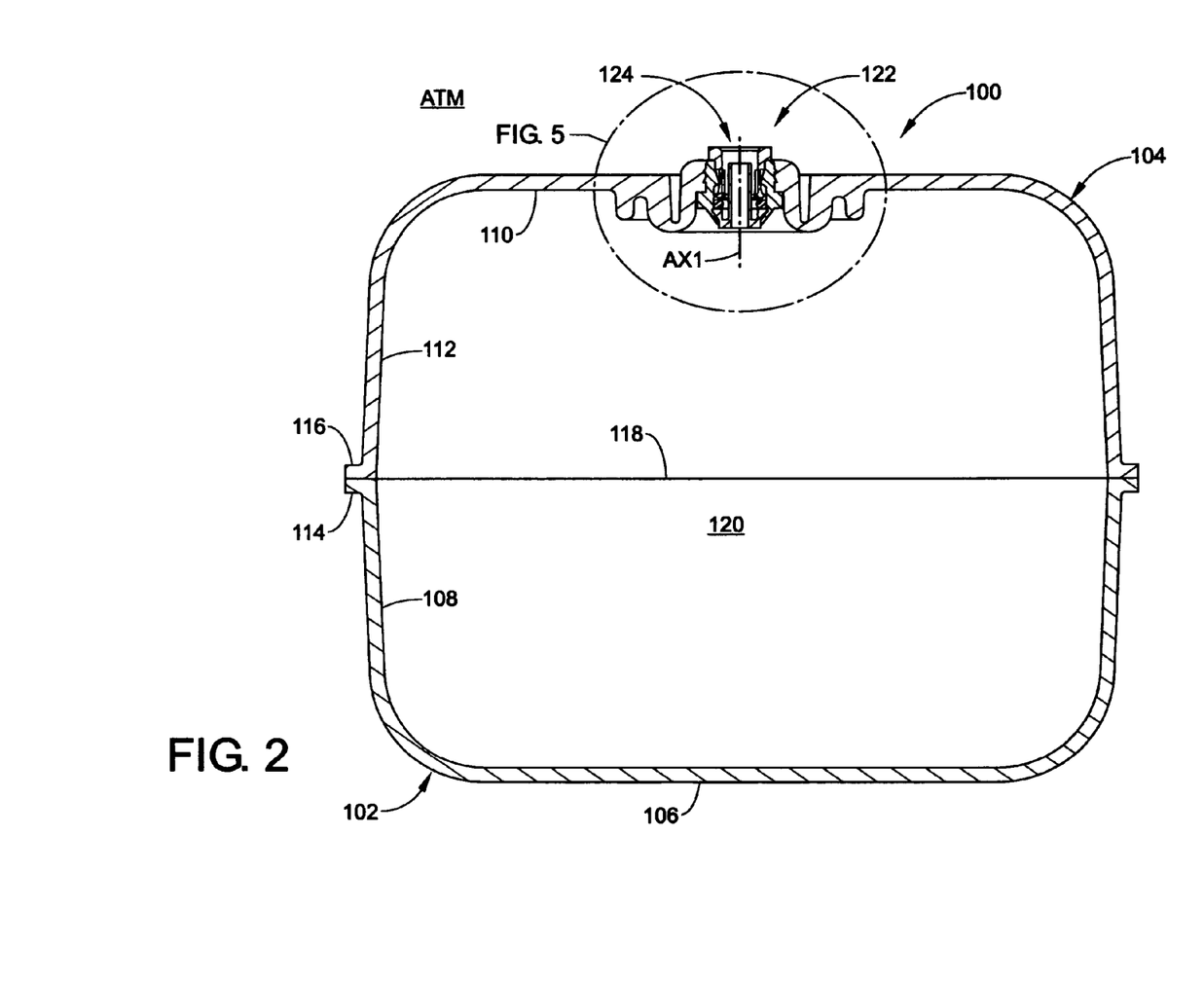
FIG. 2 is a side view, in cross section, of one embodiment of a fluid suspension member in accordance with the present novel concept.

Turning now to FIGS. 2-7 wherein the showings are for the purpose of illustrating preferred embodiments of the subject novel concept only and not for limiting the same, FIG. 2 illustrates a fluid suspension member 100 in accordance with the present novel concept that includes a first or lower cup portion 102 and a second or upper cup portion 104. Lower cup portion 102 includes a lower end wall 106 and a lower side wall 108 extending from the lower end wall in a typical manner. Upper cup portion 104 similarly includes an upper end wall 110 and an upper side wall 112 extending from the upper end wall. Cup portions 102 and 104 are generally cylindrical in cross section and include radially outwardly extending annular flanges 114 and 116, respectively, formed on side walls 108 and 112 opposite end walls 106 and 110. Cup portions 102 and 104 are connected along flanges 114 and 116 at joint 118, and together define a fluid chamber 120. In a typical manner, well known to those of skill in the art, the fluid suspension member generally maintains fluid chamber 120 at a fluid pressure different than that of the surrounding ambient atmosphere ATM.

Figure 3:
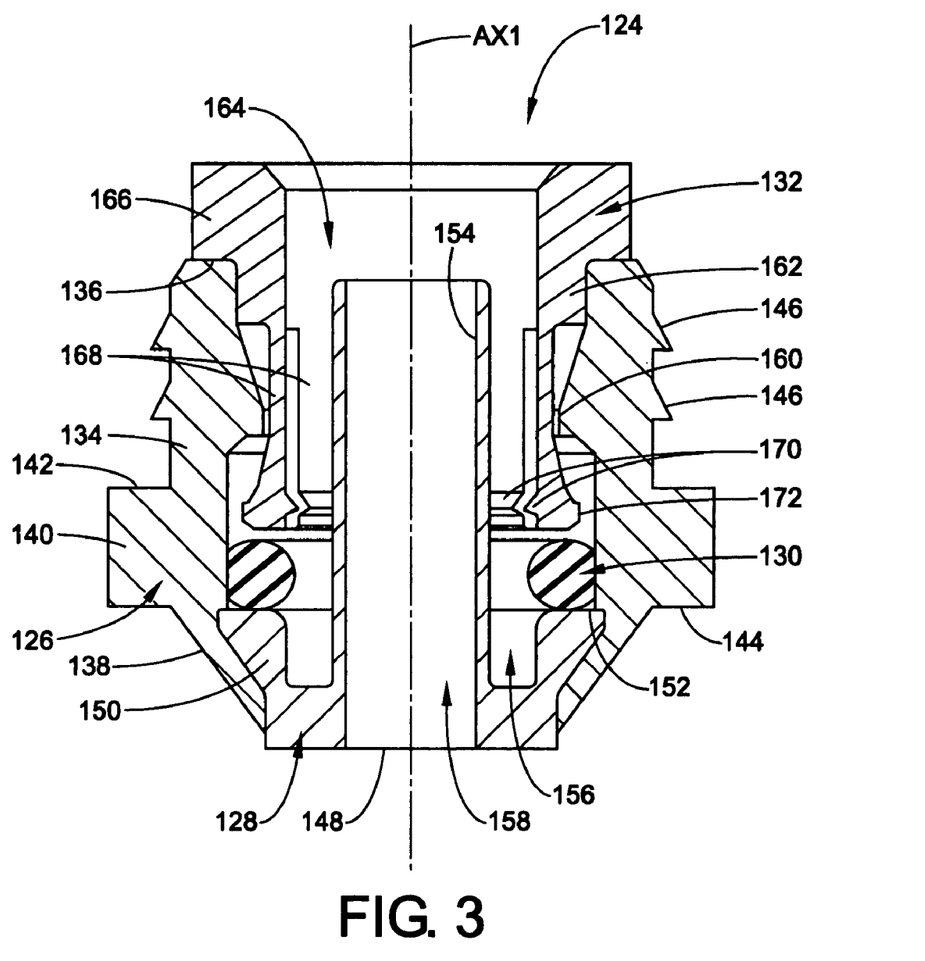
FIG. 3 is an enlarged side view of the connector shown in FIG. 2.

Fluid suspension member 100 includes a fluid inlet shown generally at 122 formed along upper end wall 110 and having a push-pull type connector shown generally at 124 extending along an axis AX1. It will be understood that the general structure and principles of operation of such push-pull type connectors are well known and that similar connectors are commonly used. As can be seen in FIG. 3, connector 124 includes a connector body 126, an inner support member 128, a sealing member, such as an o-ring 130, for example, and a retaining member 132. Connector body 126 includes a substantially cylindrical body wall 134 extending between an end wall 136 and a frustoconical support wall 138. A flange 140 extends radially outwardly from body wall 134 adjacent support wall 138 and has opposing annular faces 142 and 144. A plurality of retaining features, such as annular barbs 146, for example, are provided along body wall 134 for interengaging the material of end wall 110.

Inner support member 128 includes a bottom wall 148 and a frustoconical support wall 150 extending radially outwardly from bottom wall 148 and terminating at an opposing end wall 152. An inner support wall 154 extends from bottom wall 148 and is spaced radially inwardly from frustoconical support wall 150 forming an axially extending annular groove 156 between support walls 150 and 154. A fluid passage 158 is defined by inner support wall 154 and extends through bottom wall 148. Frustoconical support wall 150 of inner support member 128 is in abutting engagement with support wall 138 of connector body 126. End wall 152 of the inner support member acts as a shoulder that supports o-ring 130.

An annular projection 160 extends radially inwardly from body wall 134 of connector body 126 and is cooperable with retaining member 132, as will be discussed below. Retaining member 132 includes a generally cylindrical wall 162 having a passage 164 formed therethrough. A flange 166 extends radially outwardly from wall 162 adjacent end wall 136 of connector body 126. A plurality of fingers 168 separated by slots (not numbered) extend from wall 162 opposite flange 166. A barb 170 is provided on each finger along passage 164 for engaging the exterior of a length of tubing (not shown). Opposite barbs 170 on the outer surface of each finger 168 is a shoulder 172 operative to engage projection 160 and radially-inwardly displace the fingers such that barbs 170 engage the exterior of the tubing (not shown) to grip and retain the same within the connector.

Figure 4:
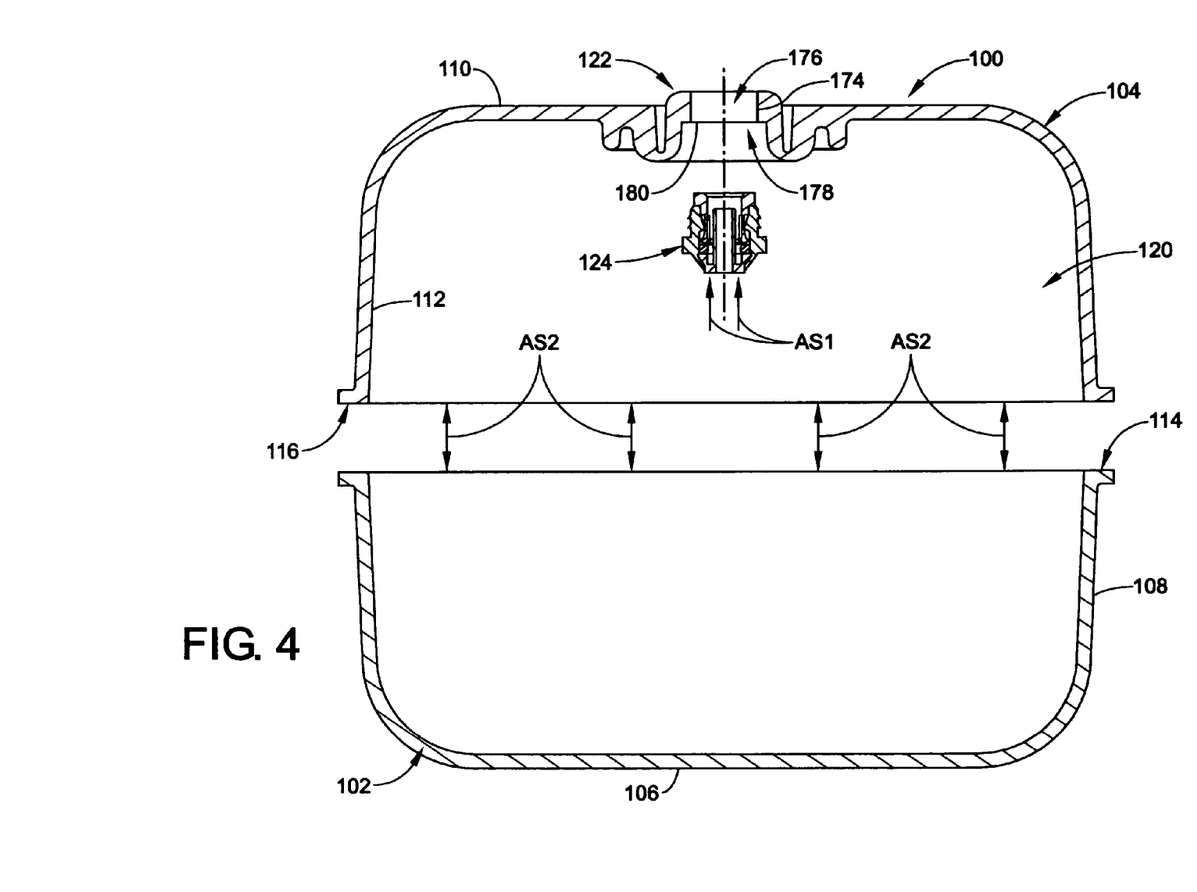
FIG. 4 is a side view, in cross section, of the fluid suspension member in FIG. 2 prior to assembly.

FIG. 4 illustrates the components of fluid suspension member 100 prior to assembly. Fluid inlet 122 on upper cup portion 104 includes a passage wall 174 forming a passage 176 through end wall 110. A recess 178 extends into end wall 110 adjacent passage 176 and terminates at a recess end wall 180.

In one example of a method of assembling fluid suspension member 100, a first assembly step includes press fitting connector 124 into passage 176, as indicated generally by arrows AS1. Preferably, connector 124 is oriented such that retaining member 132 extends through end wall 110 and face 142 of flange 140 engages recess end wall 180 of recess 178. By being pressed into abutting engagement with recess end wall 180, flange 140 prevents the connector from being pulled through and out of passage 176 due to loads applied to the fluid supply line or tubing (not shown). Alternately, connector body 126 can be pressed into passage 176 without the other components of fitting connector 124. These other components can then be inserted in a later step from the exterior of the fluid suspension member once assembled.

Since connector 124 is shown as being installed from within the interior of cup portion 104, the foregoing step is preferably performed first, as discussed above. Once connector 124 has been installed on end wall 110 at fluid inlet 122, a second assembly step of securing cup portions 102 and 104 together can be completed, as indicated generally by arrows AS2, to form joint 118 and fluid chamber 120. Joint 118 can be formed in any suitable manner, such as by welding, using adhesive or one or more crimped retaining members, for example. In one exemplary embodiment, cups 102 and 104 are molded from a polymeric material, such as polyurethane, for example, and joint 118 is formed by welding flanges 114 and 116 together using a suitable welding method well known by skilled artisans. Examples of such welding methods include ultrasonic welding, hot plate welding and spin welding. It will be appreciated, however, that any suitable material or materials can be used and that any suitable method of joining the same can also be used.

Figure 5:
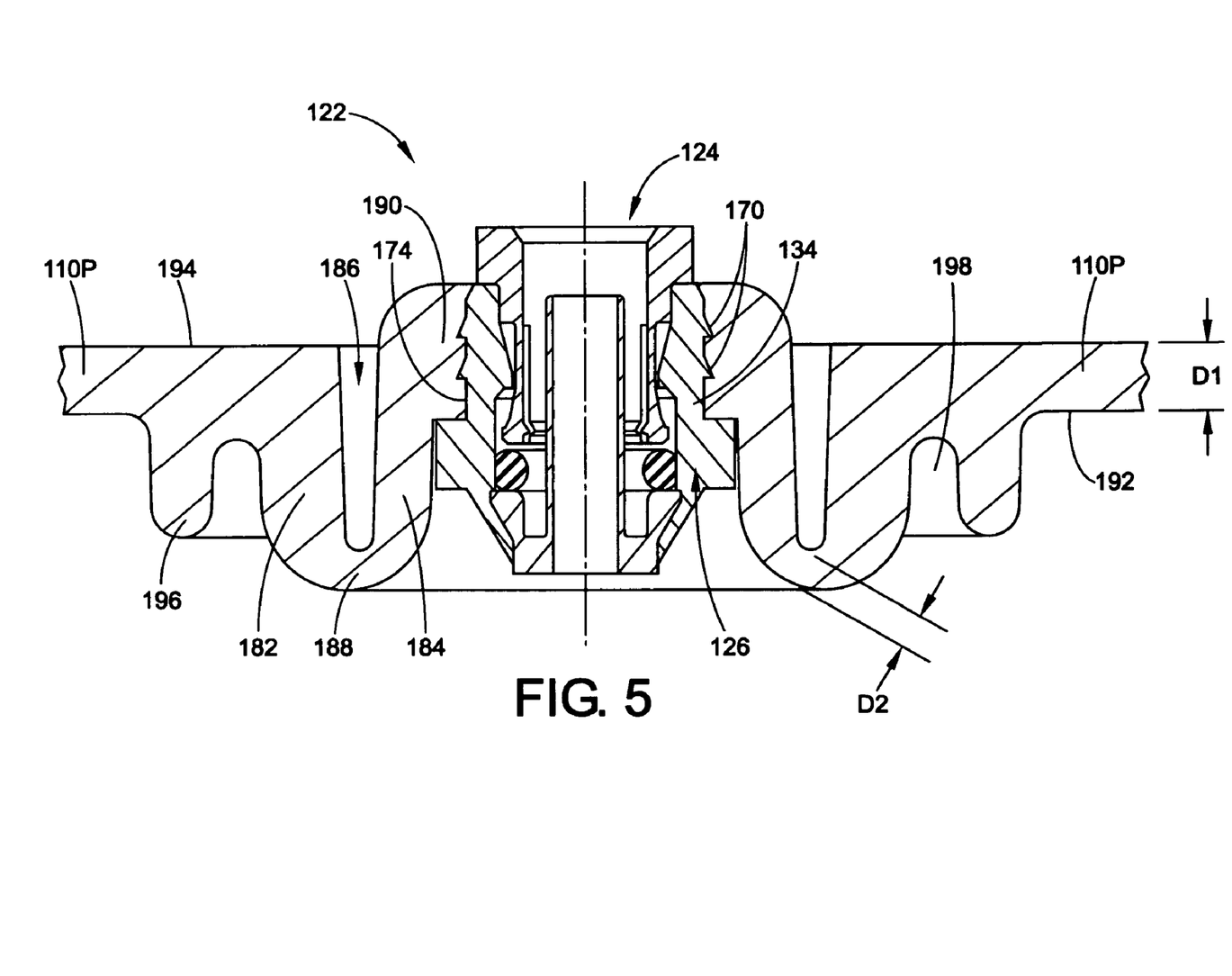
FIG. 5 is an enlarged view of Detail 5 of the fluid suspension member shown in FIG. 2.

End wall 110 is shown as having a substantially uniform peripheral portion 110P extending around fluid inlet 122. Peripheral portion 110P is shown in FIG. 5 as having a nominal wall thickness dimension D1. In one exemplary embodiment, the fluid inlet is formed along an axis of a generally cylindrical fluid suspension member and the substantially uniform peripheral portion of the end wall evenly surrounds the fluid inlet. It will be understood, however, that the fluid suspension member can take any suitable shape or configuration, and that the fluid inlet can be formed along any suitable portion of any wall of the fluid suspension member, including without limitation end walls 106 and 110. As such, fluid inlet 122 need not be centered on the end wall. Therefore, uniform peripheral portion 110P of end wall 110 need not extend evenly or entirely around the fluid inlet.

Fluid inlet 122 includes a first wall portion 182 and a second wall portion 184 extending generally axially relative to peripheral portion 110P and formed integrally therewith. The first and second wall portions, according to one embodiment, are generally annular and are radially spaced from one another forming an annular groove 186. Wall portions 182 and 184 are joined by an annular flex wall 188 extending therebetween and forming the bottom wall of groove 186. Annular flex wall 188 is shown in FIG. 5 as having a minimum wall thickness dimension D2. A retention ring 190 is formed along wall portion 184 and extends radially inwardly to passage wall 174.

During assembly, connector 124 is pressed into passage 176 and barbs 170 on connector body 126 embed into retention ring 190 to retain the connector thereon. Preferably, the diameter of passage 176 is less than the diameter of body wall 134 of connector body 126. Thus, when the connector body is pressed into the passage during assembly, the material of retention ring 190 is highly stressed and forms a fluid-tight compressive seal around the connector body. Therefore, the use of other sealing techniques, such as over-molding, and the use of other materials, such as adhesive, can be avoided.

Figure 6:
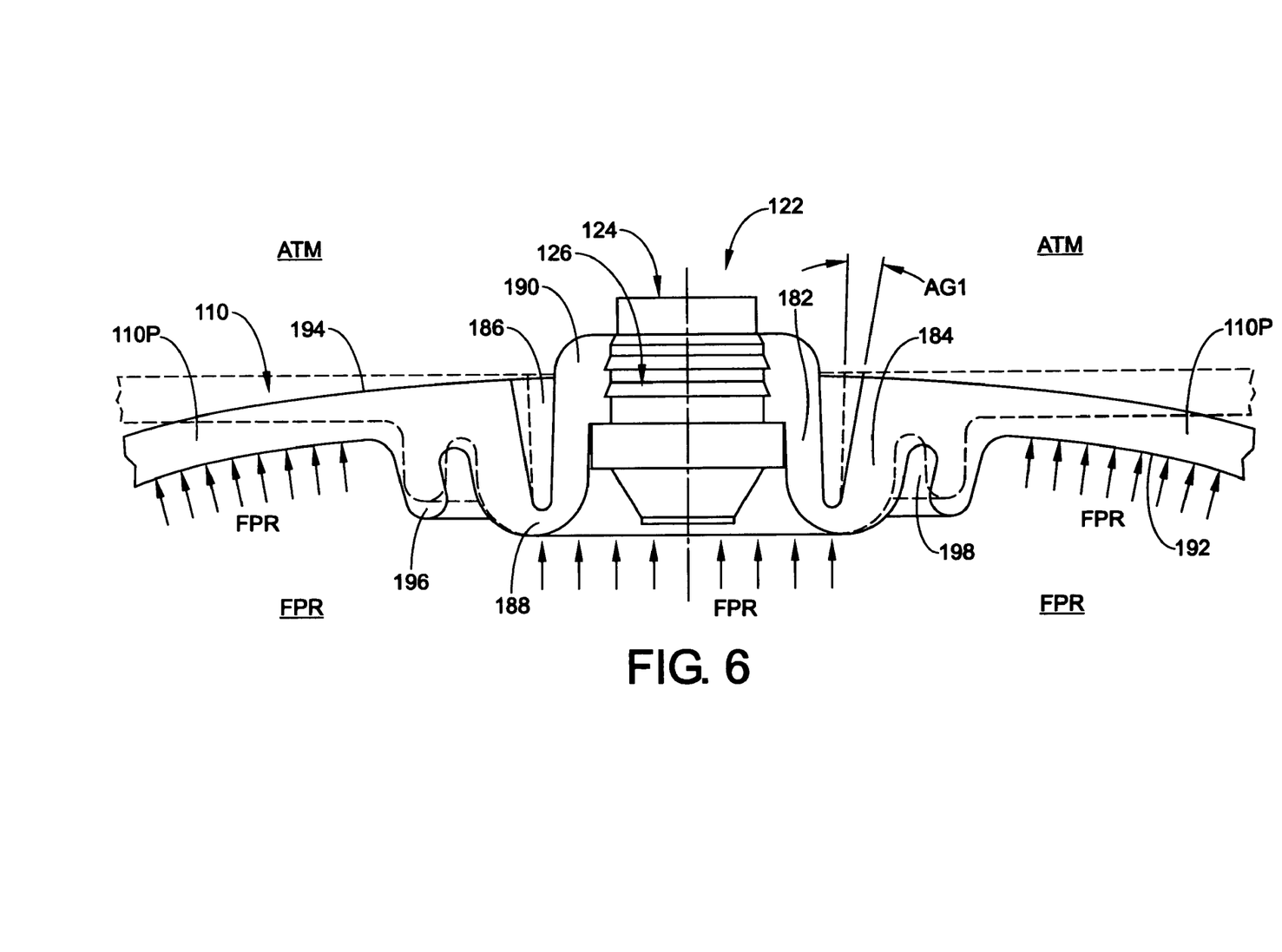
FIG. 6 is a view of the end wall and connector in FIG. 5 shown undergoing inflation induced deflection.

Turning to FIG. 6, end wall 110 and fluid inlet 122 thereon are shown in a deflected condition that is typical of inflated fluid suspension members having a flexible end wall. The deflection of end wall 110 shown in FIG. 6 is due to fluid pressure FPR within the fluid suspension member acting on only one side of the end wall, namely along an inner side 192. Ambient atmospheric pressure ATM acts along an opposing, outer side 194 of the end wall. It is, of course, well understood that the pressures act uniformly on the respective surfaces, and along the surfaces of all other walls of the fluid suspension member as well. However, with fluid pressure FPR typically being substantially greater than ambient atmospheric pressure ATM, the pressure differential acts to deflect the end wall outwardly into a crowned or domed shape, as is illustrated by the deflection of peripheral portion 110P, for example. Such inflation induced deflection causes corresponding inflation induced stresses along the walls of the fluid suspension member, including end wall 110, and these stresses normally include tensile stresses acting at least along the outer surface thereof.

In known suspension members such tensile stresses would be permitted to reach the material adjacent the connector or fitting secured on the end wall. These tensile stresses would then act to separate the material from the connector or fitting. As discussed above, this could undesirably result in at least a partial loss of seal integrity around and along the connector or fitting. In an embodiment or construction in accordance with the present novel concept, however, these tensile stresses are isolated, such as by groove 186, and redirected through other portions of the end wall, such as through flex wall 188. As a result, groove 186 deflects in a suitable manner, such as by dilating or opening outwardly as indicated by angle AG1 in FIG. 6. Thus, the compressive stress in the material of retention ring 190 around connector body 126 of connector 124 maintains the fluid-tight seal therebetween.

Figure 7:
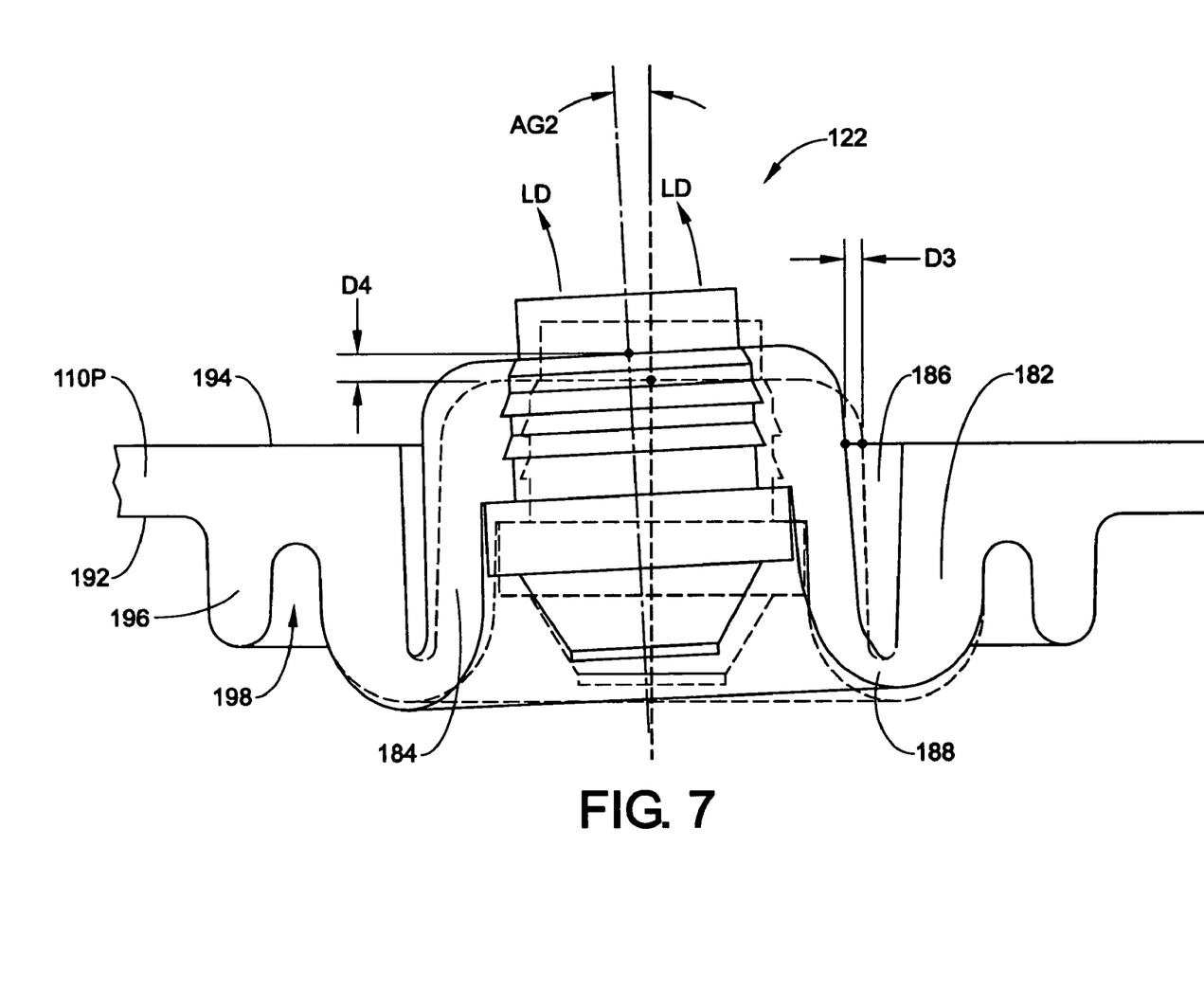
FIG. 7 in a view of the end wall and connector in FIG. 5 shown undergoing a deflection induced by an external load.

Additionally, groove 186 and flex wall 188 can act as a stress relief for externally applied loads acting on the connector, such as from a fluid supply line or tubing (not shown), for example. In FIG. 7, fluid inlet 122 is shown in a deflected condition due to a load, shown by arrows LD, applied on the connector. The groove and flex wall permit the connector to deflect in any direction or combination of directions, including laterally as indicated by dimension D3, vertically as indicated by dimension D4 or torsionally as indication by angular dimension AG2 without adversely affecting makeup of the fitting or sealing engagement between the coupled components.

It will be appreciated that the illustrations in FIGS. 6 and 7 are merely exemplary of typical loads and end wall deflections, and of the response to such loads and deflections provided by the subject groove and flex wall arrangement. Additionally, it will be recognized that some combination of the loads and deflections illustrated in each of FIGS. 6 and 7 will likely be present during use of the fluid suspension member. Furthermore, it will be understood by the skilled artisan that the various wall thicknesses and other dimensions shown and described, particularly those of end wall 110 and fluid inlet 122, can be adapted or modified to provide the desired deflection and stress relief depending upon numerous other factors, such as anticipated loads, environmental conditions and mechanical properties of the material, for example.

In the exemplary embodiment illustrated, minimum wall thickness dimension D2 (FIG. 5) of flex wall 188 is less than nominal wall thickness dimension D1 of peripheral portion 110P of end wall 110. Thus, where end wall 110 is formed from a homogeneous material, loads applied along the connector will cause a deflection of groove 186 and flex wall 188, as has been shown and described above. This action redirects any potential separation-causing stresses to other parts of the end wall rather than undesirably stressing the interface between the end wall and the connector.

To assist in the prevention of excessive deflection of the groove and/or flex wall, additional material can optionally be provided adjacent the groove and flex wall. One example of a suitable embodiment is shown in FIGS. 5-7 as an over-expansion ring 196 that is positioned radially outwardly from first wall portion 182. In the embodiment shown, over-expansion ring 196 is spaced from first wall portion 182 and forms a second groove 198 therebetween. Generally, the additional material of ring 196 provides hoop stresses spaced radially outwardly of the groove and flex wall. The hoop stresses act to stiffen the fluid inlet without directly stressing the material of retention ring 190, which could adversely effect the fluid-tight seal formed thereby. As such, it will be understood that any suitable arrangement or configuration adapted to stiffen the fluid inlet without directly stressing the material adjacent the connector can be used without departing from the principles of the present novel concept.

It is to be distinctly understood that the geometry of fluid inlet 122 generally and of groove 186 and flex wall 188 more specifically are merely exemplary embodiments of suitable geometry, and that any other suitable geometry can be used without departing from the principles of the present novel concept. For example, the present embodiments show and describe a substantially cylindrical fluid suspension member having a central axis and the annular groove extending substantially coaxially with the connector, which is installed on the end wall along the central axis. However, in other applications the connector may be secured on the end wall in spaced relation to the central axis. Preferably, the groove and flex wall will remain disposed substantially around the connector. The groove can have any suitable depth-to-width ratio, can take any suitable form or shape, and can extend only partly around the connector. In the latter case, a plurality of grooves can optionally be disposed around the connector providing stress relieving properties similar to those provided by an annular groove. Such a plurality of grooves could take the form of a substantially annular groove that is segmented by radially-outwardly extending webs or partitions, for example. Or, as another example, such a plurality of grooves could take the form of separate grooves arranged in a non-circular pattern around the connector, such as in a hexagon or octagon pattern, for example.

While the invention has been described with reference to the preferred embodiment and considerable emphasis has been placed herein on the structures and structural interrelationships between the component parts of the embodiment disclosed, it will be appreciated that other embodiments of the invention can be made and that many changes can be made in the embodiment illustrated and described without departing from the principles of the invention. Obviously, modifications and alterations will occur to others upon reading and understanding the preceding detailed description. Accordingly, it is to be distinctly understood that the foregoing descriptive matter is to be interpreted merely as illustrative of the present invention and not as a limitation. As such, it is intended that the invention be construed as including all such modifications and alterations insofar as they come within the scope of the appended claims and any equivalents thereof.

The invention claimed is:

1. A gas spring adapted for use with an associated gas line, said gas spring comprising:
    a spring wall at least partially defining a spring chamber; and,
    a connector fitting secured on said spring wall and operative to form a substantially fluid-tight seal with the associated gas line;
    said spring wall including:
        a first wall portion at least partially defining a passage extending therethrough, said passage having an axis, and said connector fitting being received within said passage and sealingly engaging said first wall portion;
        a second wall portion spaced radially outwardly from said first wall portion and at least partially forming a first axially-extending groove therebetween; and,
        a third wall portion connected between said first and second wall portions and at least partially forming a closed end of said first axially-extending groove, said third wall portion being substantially more capable of flexing than said first and second wall portions thereby permitting displacement of said first wall portion relative to said second wall portion and thereby reducing stresses in said first wall portion that are capable of separating said first wall portion from said connector fitting.

2. A gas spring according to claim 1, wherein said spring wall has a first side at least partially defining an exterior of said gas spring and an opposing, second side at least partially defining said spring chamber, and said first groove extends into said spring wall from along said first side.

3. A gas spring according to claim 1 further comprising a fourth wall portion extending circumferentially about said axis and protecting axially from along said spring wall, said fourth wall portion disposed radially outwardly of said first, second and third wall portions such that a second groove is at least partially defined thereby between said third and fourth wall portions with said second groove being spaced radially outwardly from said first groove.

4. A gas spring according to claim 3, wherein said spring wall has a first side at least partially defining an exterior of said gas spring and an opposing, second side at least partially defining said spring chamber, and said second groove extends into said spring wall from along said second side.

5. A gas spring according to claim 1, wherein said first wall portion has a first nominal wall thickness, said second wall portion has a second nominal wall thickness, and said third wall portion has a minimum wall thickness that is less than said first and second nominal wall thicknesses.

6. A gas spring according to claim 1, wherein said connector fitting includes a fitting body received in said passage in abutting engagement with said spring wall, said fitting body including a first end adapted to receive the associated gas line, an opposing second end and a radially-outwardly extending flange disposed in spaced relation to said first end, said fitting body being oriented along said passage such that said second end and said flange are disposed toward said spring chamber with respect to said first end.

7. A gas spring according to claim 6, wherein said first wall portion includes an outer end wall and a shoulder that is disposed toward said spring chamber in spaced relation to said outer end wall, and said fitting body is oriented along said passage such that said flange is in abutting engagement with said shoulder.

8. A gas spring comprising:
a flexible wall at least partially defining a spring chamber; and
a connector fitting disposed along said flexible wall;
said flexible wall including:
   a first wall portion at least partially defining a passage extending therethrough and having a longitudinally-extending axis with said connector fitting received within said passage and sealingly engaging said first wall portion along an interface formed therebetween;
   a second wall portion spaced radially outwardly from said first wall portion and at least partially forming a first axially-extending groove therebetween; and,
   means for permitting displacement of said first wall portion relative to said second wall portion and for substantially reducing separation-causing stresses within said second wall portion resulting from displacement of said first wall portion relative to said second wall portion from reaching said interface between said first wall portion and said connector fitting.

9. A gas spring according to claim 8, wherein said first and second wall portions each include nominal wall thicknesses, and said means for permitting displacement of said first wall portion relative to said second wall portion includes a third wall portion connecting said first and second wall portions and at least partially forming a closed end of said first groove, said third wall portion having a minimum wall thickness that is substantially less than said first and second nominal wall thicknesses.

10. A gas spring according to claim 8, wherein said flexible wall includes means disposed radially outwardly from said second wall portion for resisting deflection of said flexible wall due at least in part to an action of said means for permitting displacement of said first wall portion relative to said second wall portion.

11. A gas spring according to claim 10, wherein said means for resisting deflection includes a fourth wall portion that at least partially forms a second groove disposed radially outwardly from said first groove and between said second and fourth wall portions.

12. A gas spring according to claim 8, wherein said flexible wall includes an inner side, an outer side and a recess formed into said flexible wall along said passage that extends from said inner side toward said outer side with said connector fitting being at least partially received with said recess.

13. A gas spring comprising:
a spring wall including first, second and third wall portions;
said first wall portion defining a passage extending through said spring wall, said passage having an axis and being adapted to receive an associated gas line connector fitting such that a substantially fluid-tight seal can be formed therewith;
said second wall portion spaced radially outwardly from said first wall portion such that an axially-extending groove is formed therebetween;
said third wall portion interconnecting said first and second wall portions and thereby at least partially forming a closed end of said axially-extending groove; and,
said first, second and third wall portions configured to permit displacement of said first wall portion relative to said second wall portion and thereby minimize the generation of stresses along said passage of said first wall portion that could result in separation of said first wall portion from the associated gas line connector fitting.

14. A gas spring according to claim 13, wherein said first wall portion includes a retention ring projecting radially-inwardly into said passage and at least partially forming a section thereof.

15. A gas spring according to claim 14, wherein said retention ring terminates at a shoulder wall extending radially-outwardly from within said passage that at least partially defines a recess in said first wall portion for receiving the associated gas line connector fitting.

16. A gas spring according to claim 13, wherein said spring wall includes a fourth wall portion disposed radially-outwardly of said first, second and third wall portions such that a second axially-extending groove is formed between said second and fourth wall portions with said fourth wall portion being operative to minimize deflection of said spring wall in an area radially outward of said fourth wall portion.

17. A gas spring according to claim 16, wherein at least one of said first and second axially-extending grooves is approximately annular and extends approximately continuously about said axis.

18. A gas spring according to claim 13, wherein said first wall portion has a first nominal wall thickness, said second wall portion has a second nominal wall thickness, and said third wall portion has a minimum wall thickness that is less than said first and second nominal wall thicknesses.

19. A gas spring according to claim 13, wherein said spring wall is operative as an end wall of said gas spring and said gas spring further comprises a side wall extending from said end wall.

* * * * *